US011479868B2

(12) United States Patent
Manabe et al.

(10) Patent No.: US 11,479,868 B2
(45) Date of Patent: Oct. 25, 2022

(54) ELECTROLYTIC DEVICE

(71) Applicant: DE NORA PERMELEC LTD, Fujisawa (JP)

(72) Inventors: Akiyoshi Manabe, Fujisawa (JP); Masahiro Ohara, Fujisawa (JP)

(73) Assignee: DE NORA PERMELEC LTD, Fujisawa (JP)

( * ) Notice: Subject to any disclaimer, the term of this patent is extended or adjusted under 35 U.S.C. 154(b) by 309 days.

(21) Appl. No.: 16/632,943

(22) PCT Filed: Sep. 7, 2017

(86) PCT No.: PCT/JP2017/032284
§ 371 (c)(1),
(2) Date: Jan. 22, 2020

(87) PCT Pub. No.: WO2019/049265
PCT Pub. Date: Mar. 14, 2019

(65) Prior Publication Data
US 2020/0157694 A1 May 21, 2020

(51) Int. Cl.
C25B 9/19 (2021.01)
C25B 15/02 (2021.01)
(Continued)

(52) U.S. Cl.
CPC ............. C25B 9/19 (2021.01); C25B 1/04 (2013.01); C25B 15/02 (2013.01); C25B 15/085 (2021.01); C25B 15/087 (2021.01)

(58) Field of Classification Search
CPC ......... C25B 1/04; C25B 15/08; C25B 15/083; C25B 15/085; C25B 15/087; C25B 9/19; B01D 2256/16; C01B 3/50; Y02E 60/32
See application file for complete search history.

(56) References Cited

U.S. PATENT DOCUMENTS 4,002,440 A * 1/1977 Saari .................. B01D 19/0068
95/266
6,033,549 A * 3/2000 Peinecke .................. C25B 1/04
205/335

(Continued)

FOREIGN PATENT DOCUMENTS

JP 2002-348694 12/2002
JP 2005-248712 9/2005

(Continued)

OTHER PUBLICATIONS

International Search Report, issued in the corresponding PCT application No. PCT/JP2017/032284, dated Oct. 10, 2017, 7 pages (including translation).

*Primary Examiner* — Ciel P Contreras
(74) *Attorney, Agent, or Firm* — Hamre, Schumann, Mueller & Larson, P.C.

(57) ABSTRACT

Provided is an electrolytic apparatus capable of pressurizing hydrogen gas produced by the electrolytic apparatus and removing impurities in the produced hydrogen gas.
In the electrolytic apparatus, gas compression means 101 including an ejector 110, a storage tank 103 storing a circulation liquid, a circulation pipe 105 circulating a fluid mixture of hydrogen gas and the circulation liquid to the ejector, and a circulation pump 104 is provided in a discharge line 12 for hydrogen gas produced by electrolysis, a hydrogen gas discharge pipe 106 and a first valve V1 are provided in the storage tank 103, impurities in the hydrogen gas are transferred to the circulation liquid to remove the impurities from the hydrogen gas, and a pressure of the hydrogen gas stored in the storage tank 103 is raised by controlling a flow rate of the circulation liquid circulated from the storage tank 103 to the ejector 110 and opening and closing of the first valve V1.

9 Claims, 2 Drawing Sheets

(51) Int. Cl.
*C25B 1/04* (2021.01)
*C25B 15/08* (2006.01)

(56) References Cited

U.S. PATENT DOCUMENTS

2007/0163649 A1 7/2007 Yamagishi et al.
2016/0368789 A1 12/2016 Manabe et al.

FOREIGN PATENT DOCUMENTS

| JP | 2009-158166 | 7/2009 |
| JP | 2010-143778 | 7/2010 |
| JP | 2015-029921 | 2/2015 |
| JP | 2016-020296 | 2/2016 |
| WO | 2016/204233 | 12/2016 |

\* cited by examiner

[Fig. 1]
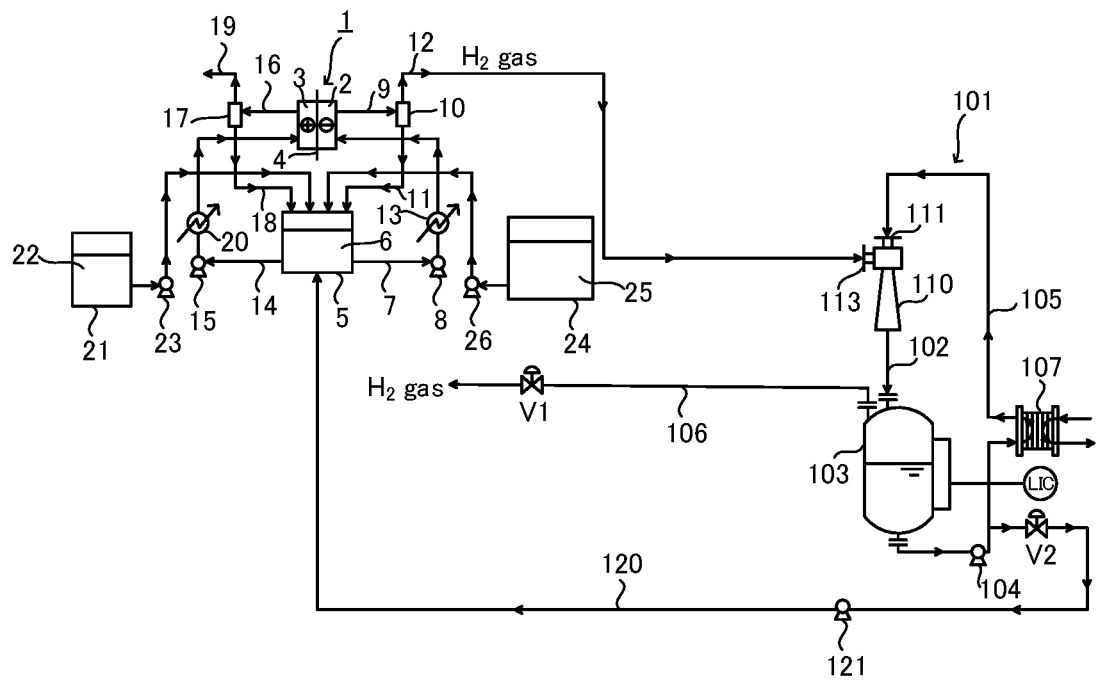
[Fig. 2]
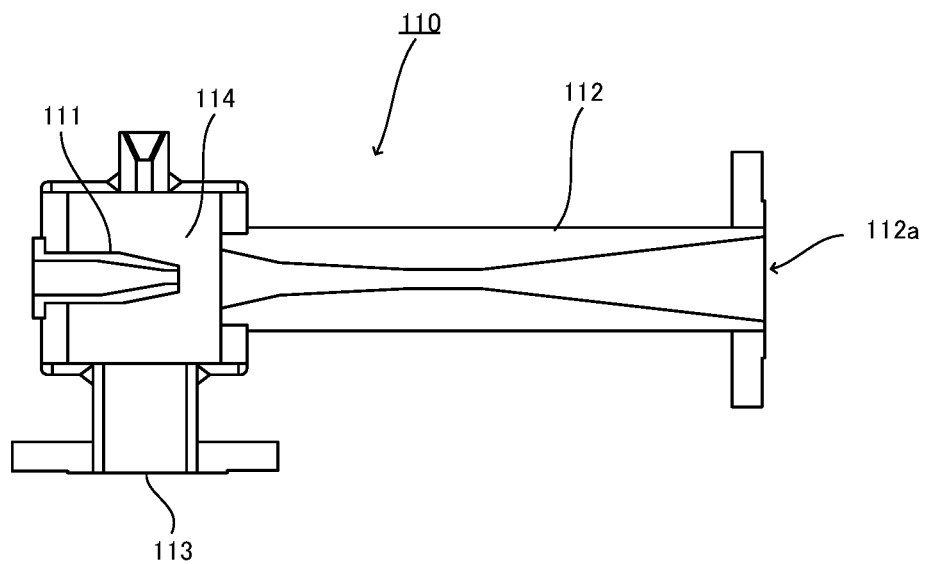

[Fig. 3]
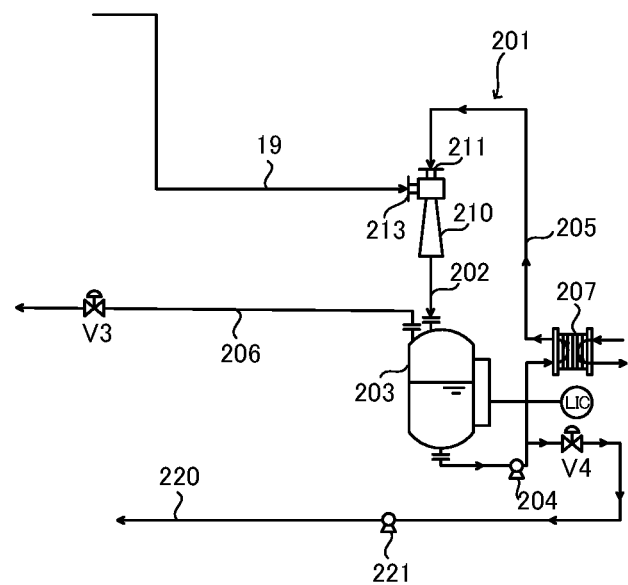

ELECTROLYTIC DEVICE

TECHNICAL FIELD

The present invention relates to an electrolytic apparatus that generates hydrogen gas by electrolysis.

BACKGROUND ART

In alkaline water electrolysis, electrolysis of unpurified water, brine electrolysis, electrolysis of chloride aqueous solution, bromic acid aqueous solution, hydrochloric acid, and sulfuric acid aqueous solution, etc., hydrogen gas is generated from a cathode chamber by electrolysis.

An alkaline water electrolytic apparatus and an alkaline water electrolysis method described in Patent Literature 1 are an example of an electrolytic apparatus and an electrolysis method for generating hydrogen gas. In the electrolytic apparatus and the electrolysis method described in Patent Literature 1, an anolyte and a catholyte including a gas-liquid mixed fluid produced in an anode chamber and a cathode chamber are collected in a common circulation tank, mixed in the circulation tank, and then circulated and supplied to both electrolytic chambers of the anode chamber and the cathode chamber. By mixing the anolyte and the catholyte in the circulation tank, continuous electrolysis is carried out while maintaining concentrations of electrolytes supplied to both the electrolytic chambers at the same concentration and constantly maintaining constant concentration.

In recent years, it has become important to escape from fossil fuels to prevent global warming, and use of hydrogen gas as an alternative energy source has been widely studied. For example, as disclosed in Patent Literature 2, high-purity hydrogen gas generated by electrolysis is required to be pressurized by a compressor so that the hydrogen gas is transferred to a subsequent process such as storage.

In alkaline water electrolysis, electrolysis of unpurified water, brine electrolysis, electrolysis of chloride aqueous solution, aqueous bromide solution, hydrochloric acid, sulfuric acid aqueous solution, etc., hydrogen gas is generated from the cathode chamber and oxygen gas, ozone gas and/or chlorine gas is generated from the anode chamber by electrolysis. Oxygen gas may be discharged into the atmosphere in some cases or recovered and used for another purpose in some cases. Ozone gas and chlorine gas are recovered and used.

CITATION LIST

Patent Literature

Patent Literature 1: JP 2015-29921 A
Patent Literature 2: JP 2010-143778 A

SUMMARY OF INVENTION

Technical Problem

In the above-described conventional electrolytic apparatus, the compressor is used to pressurize the gas produced under atmospheric pressure. The compressor includes a turbo compressor and a volume compressor, both of which are large-sized devices. Therefore, a large facility area is required, facility cost is high, and noise is further problematic.

In addition, in the above-described conventional electrolytic apparatus, hydrogen gas and oxygen gas are separated from an electrolyte by a gas-liquid separator. In the alkaline water electrolytic apparatus, a mixed alkaline electrolyte is mixed in the circulation tank, and circulated and used in the anode chamber and the cathode chamber. Thus, in this instance, the hydrogen gas and the oxygen gas contain impurities such as alkaline mist, particles, etc.

In addition, in the brine electrolysis, the anolyte and the catholyte are used without being circulated in some cases and are circulated and used in some cases. In either case, the electrolyte becomes alkaline and the hydrogen gas generated in the cathode chamber contains impurities such as alkaline mist in the cathode chamber, and the electrolyte becomes acidic, and the oxygen gas generated in the anode chamber contains impurities such as acid mist in the anode chamber.

Hydrogen gas and oxygen gas separated from the electrolyte are washed using a water washing tower to remove impurities such as alkaline mist and acid mist. However, impurities such as alkaline mist, etc. may be not sufficiently removed by a simple facility such as the water washing tower, a mist separator, etc. in a line. For this reason, when aluminum is used for a part of the compressor, there is a problem that aluminum is corroded by alkaline mist. In addition, the particles contained in the gas affect operation of the compressor.

In addition, when removal of alkaline mist and acid mist in the product gas is insufficient, alkali and acid exceeding environmental standards may be discharged to the atmosphere.

An object of the present invention is to solve these problems of the conventional technology, and to provide an electrolytic apparatus capable of pressurizing hydrogen gas produced by the electrolytic apparatus and removing impurities such as alkaline mist, etc. in the produced hydrogen gas using an inexpensive facility having a small installation area.

Solution to Problem

To achieve the above object, according to a first solution of the present invention, there is provided an electrolytic apparatus including:

an electrolyzer that includes an anode chamber accommodating an anode, a cathode chamber accommodating a cathode, and a diaphragm partitioning the anode chamber and the cathode chamber;

a cathode side electrolyte discharge line connected to the cathode chamber to discharge a cathode side electrolyte containing hydrogen gas from the cathode chamber;

a cathode side gas-liquid separating means connected to the cathode side electrolyte discharge line to separate the hydrogen gas from the cathode side electrolyte;

a hydrogen gas discharge line connected to the cathode side gas-liquid separating means to discharge the hydrogen gas separated by the cathode side gas-liquid separating means from the cathode side gas-liquid separating means; and a gas compression means connected to the hydrogen gas discharge line, wherein the gas compression means includes a cathode side ejector connected to the hydrogen gas discharge line, a cathode side storage tank that stores the hydrogen gas and a cathode side circulation liquid flowing in the gas compression means, a cathode side fluid mixture feed pipe that connects the cathode side ejector and the cathode side storage tank to each other, and feeds a fluid mixture of the cathode side circulation liquid and the hydrogen gas from the cathode side ejector to the cathode side storage tank, a cathode side circulation pipe that connects the cathode side storage tank and the cathode side ejector to each other, and feeds the cathode side circulation liquid from the cathode side storage tank to the cathode side ejector, a cathode side circulation pump installed in the cathode side circulation pipe, a hydrogen gas discharge pipe connected to the cathode side storage tank to discharge the hydrogen gas from the cathode side storage tank, and a first valve provided in the hydrogen gas discharge pipe, the hydrogen gas is allowed to flow into the cathode side ejector from the hydrogen gas discharge line by circulating the cathode side circulation liquid from the cathode side storage tank to the cathode side ejector using the cathode side circulation pump, the cathode side fluid mixture feed pipe, and the cathode side circulation pipe, the hydrogen gas and the cathode side circulation liquid are mixed in the cathode side ejector, and an impurity in the hydrogen gas is transferred to the cathode side circulation liquid to remove the impurity from the hydrogen gas, and a pressure of the hydrogen gas stored in the cathode side storage tank is raised by controlling a flow rate of the cathode side circulation liquid circulated from the cathode side storage tank to the cathode side ejector and opening and closing of the first valve.

To achieve the above object, according to a second solution of the present invention, there is provided the electrolytic apparatus, further including:

an anode side electrolyte discharge line connected to the anode chamber to discharge an anode side electrolyte containing anode gas from the anode chamber;

anode side gas-liquid separating means connected to the anode side electrolyte discharge line to separate the anode gas from the anode side electrolyte;

an anode gas discharge line connected to the anode side gas-liquid separating means to discharge the anode gas separated by the anode side gas-liquid separating means from the anode side gas-liquid separating means; and impurity removal means connected to the anode gas discharge line, wherein the impurity removal means includes an anode side ejector connected to the anode gas discharge line, an anode side storage tank that stores the anode gas and an anode side circulation liquid flowing in the impurity removal means, an anode side fluid mixture feed pipe that connects the anode side ejector and the anode side storage tank to each other, and feeds a fluid mixture of the anode side circulation liquid and the anode gas from the anode side ejector to the anode side storage tank, an anode side circulation pipe that connects the anode side storage tank and the anode side ejector to each other, and feeds the anode side circulation liquid from the anode side storage tank to the anode side ejector, and an anode side circulation pump installed in the anode side circulation pipe, and the anode gas is allowed to flow into the anode side ejector from the anode gas discharge line by circulating the anode side circulation liquid from the anode side storage tank to the anode side ejector using the anode side circulation pump, the anode side fluid mixture feed pipe, and the anode side circulation pipe, the anode gas and the anode side circulation liquid are mixed in the anode side ejector, and an impurity in the anode gas is transferred to the anode side circulation liquid to remove the impurity in the anode gas.

To achieve the above object, according to a third solution of the present invention, there is provided the electrolytic apparatus, wherein the impurity removal means further includes an anode gas discharge pipe connected to the anode side storage tank to discharge the anode gas from the anode side storage tank, and a second valve provided in the anode gas discharge pipe, and a pressure of the anode gas stored in the anode side storage tank is raised by controlling a flow rate of the anode side circulation liquid circulated from the anode side storage tank to the anode side ejector and opening and closing of the second valve.

To achieve the above object, according to a fourth solution of the present invention, there is provided the electrolytic apparatus, wherein the cathode side electrolyte corresponds to an alkaline aqueous solution, and the impurity in the hydrogen gas contains alkaline mist.

To achieve the above object, according to a fifth solution of the present invention, there is provided the electrolytic apparatus, wherein the anode side electrolyte corresponds to an alkaline aqueous solution, and the impurity in the anode gas contains alkaline mist.

To achieve the above object, according to a sixth solution of the present invention, there is provided the electrolytic apparatus, wherein the anode side electrolyte corresponds to a chloride aqueous solution, and the impurity in the anode gas contains acid mist.

To achieve the above object, according to a seventh solution of the present invention, there is provided the electrolytic apparatus, wherein the anode side electrolyte corresponds to hydrochloric acid, and the impurity in the anode gas contains acid mist.

To achieve the above object, according to an eighth solution of the present invention, there is provided the electrolytic apparatus, wherein the anode side electrolyte corresponds to a bromic acid aqueous solution, and the impurity in the anode gas contains acid mist.

To achieve the above object, according to a ninth solution of the present invention, there is provided the electrolytic apparatus, wherein the anode side electrolyte corresponds to a sulfuric acid aqueous solution, and the impurity in the anode gas contains acid mist.

Advantageous Effects of Invention

According to the present invention, it is possible to pressurize hydrogen gas using an inexpensive facility having a small installation area when compared to gas compression using a conventional compressor, and to remove impurities such as alkaline mist and particles contained in the hydrogen gas.

Similarly on an anode side, it is possible to remove impurities contained in anode gas using an inexpensive facility having a small installation area. For example, even when oxygen gas generated by electrolysis is released into the atmosphere, it is possible to suppress release of the alkaline mist, acid mist, and particles into the environment. Furthermore, it is possible to pressurize the anode gas using a simple facility.

In addition, according to the present invention, since it is unnecessary to use a conventional large-sized compressor, it is possible to reduce the volume of the facility. Further, there is no vibration, noise, and mechanical damage during a long-term operation and stable operation is allowed for a long period of time. Furthermore, a maintenance cost of an apparatus is greatly reduced.

BRIEF DESCRIPTION OF DRAWINGS

FIG. 1 is a flow diagram illustrating an alkaline water electrolytic apparatus according to a first embodiment of the present invention.

FIG. 2 is a cross-sectional view illustrating details of an example of an ejector used for the alkaline water electrolytic apparatus according to the first embodiment of the present invention.

FIG. 3 is a flow diagram illustrating a part (impurity removal means) of an alkaline water electrolytic apparatus according to another embodiment of the present invention.

DESCRIPTION OF EMBODIMENTS

First Embodiment

FIG. 1 is a flow diagram illustrating an example of an electrolytic apparatus according to a first embodiment of the present invention. Here, an alkaline water electrolysis apparatus will be described as an example. However, the present invention is applicable to an electrolytic apparatus that generates hydrogen gas by electrolysis such as electrolysis of unpurified water, brine electrolysis, electrolysis of chloride aqueous solution, aqueous bromide solution, hydrochloric acid, sulfuric acid aqueous solution, etc. in addition to alkaline water electrolysis.

In FIG. 1, the alkaline water electrolytic apparatus has an electrolyzer 1. Reference numeral 2 denotes a cathode chamber accommodating a cathode, reference numeral 3 denotes an anode chamber accommodating an anode, and reference numeral 4 denotes a diaphragm partitioning the cathode chamber 2 and the anode chamber 3. The diaphragm 4 corresponds to a composite membrane including a cation exchange membrane, an anion exchange membrane, a polymer porous layer, and a nonwoven fabric, etc.

Cathode side electrolyte circulating means and cathode gas separating means are provided as a cathode side electrolyte feed path. The cathode gas separating means includes a cathode side electrolyte discharge line 9, cathode side gas-liquid separating means 10, and a hydrogen gas discharge line 12. The cathode side electrolyte circulating means includes a circulation tank 5, a cathode side electrolyte supply line 7, a circulation pump 8, and a cathode side electrolyte recovery line 11.

The cathode side electrolyte supply line 7 is a pipe that connects the cathode chamber 2 and the circulation tank 5 to each other and supplies an electrolyte 6 stored in the circulation tank 5 to the cathode chamber 2 using the circulation pump 8. The cathode side electrolyte discharge line 9 is a pipe that connects the cathode chamber 2 and the cathode side gas-liquid separating means 10 to each other and feeds an electrolyte (cathode side electrolyte) and hydrogen gas in the cathode chamber 2 to the cathode side gas-liquid separating means 10. The cathode side gas-liquid separating means 10 separates hydrogen gas from the electrolyte. The cathode side electrolyte recovery line 11 is a pipe that connects the cathode side gas-liquid separating means 10 and the circulation tank 5 to each other and feeds the electrolyte separated by the cathode side gas-liquid separating means 10 to the circulation tank 5. The hydrogen gas discharge line 12 is a pipe that connects the cathode side gas-liquid separating means 10 and gas compression means 101 described below to each other and feeds hydrogen gas separated by the cathode side gas-liquid separating means 10 to the gas compression means 101. A heat exchanger 13 is installed in the cathode side electrolyte supply line 7.

Anode side electrolyte circulating means and anode gas separating means are provided as an anode side electrolyte feed path. The anode gas separating means includes an anode side electrolyte discharge line 16, an anode side gas-liquid separating means 17, and an anode gas discharge line 19. The anode side electrolyte circulating means includes the circulation tank 5, an anode side electrolyte supply line 14, a circulation pump 15, and an anode side electrolyte recovery line 18.

The anode side electrolyte supply line 14 is a pipe that connects the anode chamber 3 and the circulation tank 5 to each other and supplies the electrolyte 6 stored in the circulation tank 5 to the anode chamber 3 using the circulation pump 15. The anode side electrolyte discharge line 16 is a pipe that connects the anode chamber 3 and the anode side gas-liquid separating means 17 to each other and feeds an electrolyte (anode side electrolyte) and anode gas (oxygen gas in the case of alkaline water electrolysis) in the anode chamber 3 to the anode side gas-liquid separating means 17. The anode side gas-liquid separating means 17 separates anode gas from the electrolyte. The anode side electrolyte recovery line 18 is a pipe that connects the anode side gas-liquid separating means 17 and the circulation tank 5 to each other and feeds the electrolyte separated by the anode side gas-liquid separating means 17 to the circulation tank 5. The anode gas discharge line 19 is a pipe connected to the anode side gas-liquid separating means 17 to discharge the anode gas separated by the anode side gas-liquid separating means 17 to an outside of a system. A heat exchanger 20 is installed in the anode side electrolyte supply line 14.

In the example of FIG. 1, the electrolyte corresponds to an alkaline aqueous solution (for example, an aqueous solution of an alkali metal hydroxide, specifically, a KOH aqueous solution or a NaOH aqueous solution).

The electrolytic apparatus of the present embodiment includes electrolyte replenishing means and water replenishing means. The electrolyte replenishing means includes an alkaline water tank 21 that stores high-concentration alkaline water 22 and a pump 23. The water replenishing means includes a pure water tank 24 that stores pure water 25 and a pump 26.

In the alkaline water electrolytic apparatus, as illustrated in FIG. 1, the circulation tank is common between an anode side and a cathode side. Therefore, in the cathode side electrolyte circulating means and the anode side electrolyte circulating means, an electrolyte in which the anode side electrolyte and the cathode side electrolyte are mixed circulates between the cathode chamber 2 and the circulation tank 5 and between the anode chamber 3 and the circulation tank 5.

The gas compression means 101 is provided on a downstream side of the hydrogen gas discharge line 12. The gas compression means 101 includes a cathode side ejector 110, a cathode side fluid mixture feed pipe 102, a cathode side storage tank 103, a cathode side circulation pump 104, a cathode side circulation pipe 105, and a hydrogen gas discharge pipe 106.

FIG. 2 is a cross-sectional view illustrating details of an example of the cathode side ejector 110. Reference numeral 111 denotes a nozzle, reference numeral 112 denotes a diffuser, reference numeral 113 denotes a suction port, and reference numeral 114 denotes a suction chamber. The nozzle 111 is connected to the circulation pipe 105. The suction port 113 is connected to the hydrogen gas discharge line 12. An outlet 112a of the diffuser 112 is connected to the cathode side fluid mixture feed pipe 102.

The cathode side fluid mixture feed pipe 102 connects the cathode side ejector 110 and the cathode side storage tank 103 to each other and feeds a fluid mixture discharged from the cathode side ejector 110 to the cathode side storage tank 103.

The cathode side storage tank 103 accommodates a circulation liquid (cathode side circulation liquid) therein. This circulation liquid corresponds to water and contains impurities (described below) contained in the hydrogen gas. Hydrogen gas separated from the fluid mixture fed from the cathode side ejector 110 is stored in an upper space of the cathode side storage tank 103. The cathode side circulation pipe 105 is connected to a bottom portion of the cathode side storage tank 103. The hydrogen gas discharge pipe 106 is connected to an upper portion of the cathode side storage tank 103. A valve V1 (first valve) is installed in the hydrogen gas discharge pipe 106.

The cathode side circulation pump 104 and a cathode side heat exchanger 107 are installed in the cathode side circulation pipe 105. The circulation liquid in the cathode side storage tank 103 is circulated to the cathode side ejector 110 through the cathode side circulation pipe 105 by the cathode side circulation pump 104.

In the electrolytic apparatus of the present embodiment, a cathode side circulation liquid ejection pipe 120 may be connected to the cathode side circulation pipe 105. A valve V2 and a pump 121 are installed in the cathode side circulation liquid ejection pipe 120. The cathode side circulation liquid ejection pipe 120 may be configured to discharge a part of the circulation liquid to the outside of the system or may be configured to circulate a part of the circulation liquid to the electrolyte. As a configuration for using the circulation liquid as the electrolyte, the cathode side circulation liquid ejection pipe 120 is connected to any one of the cathode side electrolyte feed path and the anode side electrolyte feed path. In this example of FIG. 1, the cathode side circulation liquid ejection pipe 120 is connected to the circulation tank 5. Alternatively, the cathode side circulation liquid ejection pipe 120 may be connected to any one of the cathode side electrolyte supply line 7, the cathode side electrolyte discharge line 9, the cathode side electrolyte recovery line 11, the anode side electrolyte supply line 14, the anode side electrolyte discharge line 16, and the anode side electrolyte recovery line 18.

Hereinafter, a description will be given of a process of performing electrolysis and compression of hydrogen gas using the electrolytic apparatus of FIG. 1.

Before a start and in an initial period of electrolysis, the electrolyte replenishing means supplies the alkaline water 22 from the alkaline water tank 21 to the circulation tank 5 using the pump 23. The water replenishing means supplies the pure water 25 from the pure water tank 24 to the circulation tank 5 using the pump 26. The alkaline water and the pure water are mixed in the circulation tank 5, and the electrolyte 6 is adjusted to a predetermined concentration. Together with the pure water 25, new raw material water for electrolysis may be added into the circulation tank 5.

The electrolyte 6 is supplied to the cathode chamber 2 of the electrolyzer 1 through the cathode side electrolyte supply line 7 by the circulation pump 8. The electrolyte is cooled to a predetermined temperature by passing through the heat exchanger 13. In addition, the electrolyte 6 is supplied to the anode chamber 3 of the electrolyzer 1 through the anode side electrolyte supply line 14 by the circulation pump 15. The electrolyte is cooled or heated to a predetermined temperature by passing through the heat exchanger 20.

The electrolyte is electrolyzed in the cathode chamber 2 and the anode chamber 3. In this way, hydrogen gas is generated in the cathode chamber 2, and anode gas (oxygen gas) is generated in the anode chamber 3.

The generated hydrogen gas is fed to the cathode side gas-liquid separating means 10 through the cathode side electrolyte discharge line 9 together with the electrolyte. The hydrogen gas and the electrolyte are gas-liquid separated by the cathode side gas-liquid separating means 10. The separated electrolyte is circulated through the cathode side electrolyte recovery line 11 to the circulation tank 5. The separated hydrogen gas is fed to the gas compression means 101 through the hydrogen gas discharge line 12.

The generated oxygen gas is fed to the anode side gas-liquid separating means 17 through the anode side electrolyte discharge line 16 together with the electrolyte. The oxygen gas and the electrolyte are gas-liquid separated by the anode side gas-liquid separating means 17. The separated electrolyte is circulated through the anode side electrolyte recovery line 18 to the circulation tank 5. The oxygen gas is discharged to the outside of the system through the anode gas discharge line 19.

To control the alkali concentration in the cathode chamber 2 and the anode chamber 3, the amount of water corresponding to water disappearing by electrolysis is supplied from pure water replenishing means. When pure water is continuously supplied, electrolysis is continued while an electrolysis condition such as the concentration of the electrolyte is maintained at a constant level. The pure water can be intermittently supplied depending on the volume of the circulation tank.

In the gas compression means 101, when the cathode side circulation pump 104 operates, the circulation liquid circulates through the cathode side fluid mixture feed pipe 102 and the cathode side circulation pipe 105. In the cathode side ejector 110, the circulation liquid flows from the nozzle 111 toward the diffuser 112. In this way, the hydrogen gas discharged from the hydrogen gas discharge line 12 is drawn into the suction chamber 114 from the suction port 113. The circulation liquid and the hydrogen gas are intensely mixed in the suction chamber 114, and the fluid mixture is discharged from the diffuser 112.

The fluid mixture is jetted from the cathode side fluid mixture feed pipe 102 into the cathode side storage tank 103. The circulation liquid (water) and the hydrogen gas are intensely mixed in the cathode side ejector 110, and the hydrogen gas and the circulation liquid are separated from each other in the cathode side storage tank 103. In this way, impurities such as alkaline mist (mist of alkaline aqueous solution) and particles contained in the hydrogen gas flowing through the hydrogen gas discharge line 12 are transferred to the circulation liquid, and the hydrogen gas and the impurities are separated from each other.

Further, when a packed tower (not illustrated) filled with a packing material is provided between the cathode side ejector 110 illustrated in FIG. 2 and the cathode side storage tank 103, a gas-liquid contact area between the hydrogen gas and a cathode side circulation liquid increases, and collision between the hydrogen gas and the cathode side circulation liquid is intense when the hydrogen gas and the cathode side circulation liquid pass through the packed tower. Thus, a rate of removal of impurities from the hydrogen gas increases. A plastic packing material, a metal wire structure packing material, etc. obtained by molding polypropylene resin, polyethylene resin, fluororesin, etc. into various sizes may be used as the packing material. Tellerette (Tellerette is a registered trademark of Tsukishima Kankyo Engineering Ltd.) is an example of the plastic packing material, and Raschig ring super link (Raschig ring super link is a registered trademark of Raschig company (Germany)) is an example of the metal wire structure packing material.

The packed tower is preferably provided outside the cathode side ejector 110. However, the packed tower may be provided inside the outlet 112a of the diffuser 112 of the cathode side ejector 110. Alternatively, instead of the packed tower, only the packing material filled in the inside thereof may be provided inside the outlet 112a of the diffuser 112.

The circulation liquid containing impurities stored in the cathode side storage tank 103 is circulated to the cathode side ejector 110 through the cathode side circulation pipe 105 by the cathode side circulation pump 104. During this process, the circulation liquid is cooled or heated by the cathode side heat exchanger 107.

The hydrogen gas stored in the cathode side storage tank 103 is pressurized by controlling a circulation speed (flow rate) of the cathode side circulation liquid circulating from the cathode side storage tank 103 to the cathode side ejector 110 and opening and closing of the valve V1. For example, when the operation of the electrolytic apparatus is started, the valve V1 is closed and the inside of the gas compression means 101 is set to a closed loop. When the flow rate of the cathode side circulation liquid is increased in this state, the hydrogen gas is stored in the cathode side storage tank 103 in a pressurized state. When the hydrogen gas rises to a predetermined pressure, the valve V1 is opened and a steady operation is performed.

As the flow rate of the cathode side circulation liquid is increased, a suction force of the cathode side ejector 110 increases. As a result, the amount of hydrogen gas flowing into the gas compression means 101 increases and the pressure of hydrogen gas rises. In the present invention, hydrogen gas is pressurized up to 1 MPa (10 bar). For example, when the circulation speed of the cathode side circulation liquid is increased to 150 m$^3$/h, the hydrogen gas stored in the cathode side storage tank 103 is pressurized to 0.6 MPa (6 bar) to 1 MPa (10 bar).

In general, a function of an ejector is to cause a fluid having a high speed to flow, thereby sucking gas or liquid in accordance with a flow of the fluid. In this invention, hydrogen gas is sucked into the cathode side ejector 110 through the hydrogen gas discharge line 12 by causing the cathode side circulation liquid to flow to the cathode side ejector 110. In the cathode side ejector 110, the hydrogen gas and the circulation liquid intensely collide with each other in a narrow pipe.

In this phenomenon, to attain a high pressure, a possibility that the alkaline mist corresponding to an impurity in the hydrogen gas will further collide with water corresponding to a circulation liquid and be dissolved in the water corresponding to circulation liquid increases.

In the present invention, the pressure of the hydrogen gas may be controlled by controlling the circulation speed of the cathode side circulation liquid from the cathode side storage tank 103 to the cathode side ejector 110 and opening and closing of the valve V1. A high pressure facility is unnecessary since the hydrogen gas is pressurized up to 1 MPa (10 bar) by the gas compression means 101 of the present invention. For this reason, the facility may be simplified and maintenance is facilitated.

Since it is unnecessary to use a large-sized compressor in the gas compression means 101 of the present invention, the installation area can be greatly reduced. In addition, it is unnecessary to install cooling auxiliaries, etc. of the compressor. Since the cathode side ejector 110 according to the present invention does not have a driving unit, there is no vibration, noise, and mechanical damage during a long-term operation and stable use is allowed for a long period of time. As a result, a maintenance cost of the apparatus is greatly reduced.

On the other hand, in conventional washing using a water washing tower, for example, a feed rate of washing water is 5 m$^3$/h with respect to a hydrogen generation amount of 100 Nm$^3$/h. Considering from a ratio of the washing water to the hydrogen generation amount to be processed, impurity removal efficiency is low in the washing using the water washing tower. In addition, in the washing using the water washing tower, pressurization of hydrogen gas is not performed.

The pressurized hydrogen gas from which impurities are removed is discharged to the outside the system of the electrolytic apparatus through the hydrogen gas discharge pipe 106. The discharged hydrogen gas is stored in, for example, a tank and then used for another use (such as a fuel cell). In a case of producing higher pressure hydrogen gas, it is advantageous to use hydrogen gas compressed using the electrolytic apparatus of the present invention since energy can be reduced when compared to a case of pressurizing from atmospheric pressure.

When the circulation liquid is circulated in the gas compression means 101, the alkaline mist is dissolved in the circulation liquid, and pH of the circulation liquid rises. Means (not illustrated in FIG. 1) for measuring the pH of the circulation liquid is installed in the system of the gas compression means 101 and linked with the valve V2. For example, the pH measuring means is installed in the cathode side storage tank 103 or the circulation pipe 105. When the pH of the circulation liquid reaches a predetermined value, the valve V2 is opened. Due to the opening of the valve V2, a part of the circulation liquid flows through the cathode side circulation liquid ejection pipe 120.

The cathode side circulation liquid may be discharged to the outside of the system through the circulation liquid ejection pipe 120. Alternatively, the cathode side circulation liquid may be added to the electrolyte at anyplace of the electrolyte feed path on the cathode side and the electrolyte feed path on the anode side through the cathode side circulation liquid ejection pipe 120, and used as the electrolyte. For example, in the alkaline water electrolytic apparatus illustrated in FIG. 1, the cathode side circulation liquid discharged from the gas compression means 101 is supplied to the circulation tank 5 through the cathode side circulation liquid ejection pipe 120 and mixed with the electrolyte.

Second Embodiment

FIG. 3 is an example of an electrolytic apparatus according to a second embodiment of the present invention, and is a flow diagram illustrating impurity removal means corresponding to a part of the electrolytic apparatus. In this embodiment, an alkaline water electrolytic apparatus will be described as an example.

The electrolytic apparatus of the second embodiment is an example in which impurity removal means 201 is further provided on a downstream side of the anode gas discharge line 19 of the electrolytic apparatus according to the first embodiment illustrated in FIG. 1. A configuration of the impurity removal means 201 is basically the same as that of the gas compression means 101. That is, the impurity removal means 201 includes an anode side ejector 210, an anode side fluid mixture feed pipe 202, an anode side storage tank 203, an anode side circulation pump 204, an anode side circulation pipe 205, and an anode gas discharge pipe 206. A valve V3 (second valve) is installed in the anode gas discharge pipe 206.

The anode side ejector 210 has the same configuration as that of the cathode side ejector 110 described in the first embodiment. A nozzle 211 of the anode side ejector 210 is connected to the anode side circulation pipe 205. A suction port 213 of the anode side ejector 210 is connected to the anode gas discharge line 19. A diffuser outlet of the anode side ejector 210 is connected to the anode side storage tank 203 through the anode side fluid mixture feed pipe 202.

Further, in the anode side ejector 210, when a packed tower (not illustrated) filled with a packing material is provided between the anode side ejector 210 and the anode side storage tank 203, a gas-liquid contact area between anode gas and an anode side circulation liquid increases, and collision between the anode gas and the anode side circulation liquid is intense when the anode gas and the anode side circulation liquid pass through the packed tower. Thus, a rate of removal of impurities from the anode gas increases.

The packed tower is preferably provided outside the anode side ejector 210. However, the packed tower may be provided inside the diffuser outlet of the anode side ejector 210. Alternatively, instead of the packed tower, only the packing material filled in the inside thereof may be provided inside the diffuser outlet.

The anode side circulation pump 204 and an anode side heat exchanger 207 are installed in the anode side circulation pipe 205. A circulation liquid (water) in the anode side storage tank 203 is circulated to the anode side ejector 210 through the anode side circulation pipe 205 and the nozzle 211 by the anode side circulation pump 204.

On the anode side, an anode side circulation liquid ejection pipe 220 may be connected to the anode side circulation pipe 205. The anode side circulation liquid ejection pipe 220 may be configured to discharge the circulation liquid to the outside of the system using the anode side circulation liquid ejection pipe 220. Alternatively, the anode side circulation liquid ejection pipe 220 may be configured to be connected to any one of an electrolyte feed path on a cathode side and an electrolyte feed path on an anode side, and a part of the circulation liquid may be added to an electrolyte. Specifically, the anode side circulation liquid ejection pipe 220 may be connected to any one of the circulation tank 5, the cathode side electrolyte supply line 7, the cathode side electrolyte discharge line 9, the cathode side electrolyte recovery line 11, the anode side electrolyte supply line 14, the anode side electrolyte discharge line 16, and the anode side electrolyte recovery line 18. A fourth valve V4 and a pump 221 are installed in the anode side circulation liquid ejection pipe 220.

A process of removing impurities and compressing the anode gas using the impurity removal means illustrated in FIG. 3 will be described below.

In the impurity removal means 201, the circulation liquid circulates through the anode side fluid mixture feed pipe 202 and the anode side circulation pipe 205 when the anode side circulation pump 204 operates. When the circulation liquid flows from the nozzle 211 toward the diffuser in the anode side ejector 210, the anode gas (oxygen gas) flowing through the anode gas discharge line 19 is drawn into the anode side ejector 210. The circulation liquid and the anode gas are intensely mixed in the anode side ejector 210, and a fluid mixture is discharged from the anode side ejector 210.

The fluid mixture is jetted from the anode side fluid mixture feed pipe 202 into the anode side storage tank 203. When the circulation liquid (water) and the anode gas are intensely mixed in the anode side ejector 210, and the anode gas and the circulation liquid are separated from each other in the anode side storage tank 203, impurities such as alkaline mist and particles are transferred to the circulation liquid, and the anode gas and the impurities are separated from each other.

The circulation liquid stored in the anode side storage tank 203 is circulated to the anode side ejector 210 through the anode side circulation pipe 205 by the anode side circulation pump 204.

When the anode gas is discharged to the atmosphere without raising the pressure, the valve V3 is fully opened.

In a case of pressurizing the anode gas, the anode gas stored in the anode side storage tank 203 is pressurized by controlling a circulation speed (flow rate) of the anode side circulation liquid from the anode side storage tank 203 to the anode side ejector 210. For example, at the time of starting the operation, the valve V3 is closed and the inside of the impurity removal means 201 is set to a closed loop. When the flow rate of the anode side circulation liquid is increased in this state, the anode gas is stored in the anode side storage tank 203 in a pressurized state. When the anode gas rises to a predetermined pressure, the valve V3 is opened and a steady operation is performed.

As the flow speed of the anode side circulation liquid is increased, the pressure of the anode gas rises. For example, the circulation speed of the anode side circulation liquid is set to 150 $m^3/h$ or less, the anode gas generated by electrolysis can be set to a low pressure of 0.6 MPa (6 bar) or less. On the other hand, when the circulation speed of the anode side circulation liquid is set to 150 $m^3/h$ or more, the anode gas generated by electrolysis can be pressurized to 0.6 MPa (6 bar) to 1 MPa (10 bar). That is, the impurity removal means 201 of the present embodiment can achieve the same effect as that of the gas compression means 101.

When the alkaline mist dissolves in the circulation liquid in the impurity removal means 201, pH of the circulation liquid rises. Means (not illustrated in FIG. 3) for measuring the pH of the circulation liquid is installed in the system of the impurity removal means 201 and linked with the valve V4. For example, the pH measuring means is installed in the anode side storage tank 203 or the anode side circulation pipe 205. When the pH of the circulation liquid reaches a predetermined value, the valve V4 is opened, and a part of the circulation liquid is discharged from the impurity removal means 201 through the anode side circulation liquid ejection pipe 220. The discharged circulation liquid may be discharged to the outside of the system through the anode side circulation liquid ejection pipe 220. The circulation liquid may be added to the electrolyte in any of the electrolyte feed path on the cathode side and the electrolyte feed path on the anode side through the circulation liquid ejection pipe 220 and used as the electrolyte. For example, in the alkaline water electrolytic apparatus, as a configuration in which the anode side circulation liquid ejection pipe 220 is connected to the circulation tank 5 illustrated in FIG. 1, the anode side circulation liquid may be supplied to the circulation tank 5 and mixed with the electrolyte.

The above embodiments describe an example in which the anode side electrolyte and the cathode side electrolyte circulate through the circulation tank 5. However, the anode side electrolyte and the cathode side electrolyte may be discharged to the outside of the apparatus by the anode side electrolyte recovery line 18 and the cathode side electrolyte recovery line 11 without circulating.

That is, FIG. 1 and FIG. 3 illustrate an example of the alkaline water electrolytic apparatus, and a description has been given of an example in which the cathode side electrolyte and the anode side electrolyte circulate to the cathode chamber 2 and the anode chamber 3 as a common electrolyte. However, the present invention may be applied to a case in which circulation of the electrolyte to the cathode chamber 2 and the anode chamber 3 is not performed.

In addition, only one of the cathode side electrolyte circulating means and the anode side electrolyte circulating means may be installed in some cases. For example, while the cathode side may have a configuration in which the cathode side electrolyte circulating means is provided and the electrolyte is circulated to the cathode chamber 2, and the anode side may have a configuration in which the electrolyte is discharged from the anode side electrolyte recovery line to the outside of the apparatus without being circulated to the anode chamber 3.

Further, the present invention may be applied to electrolysis of aqueous solution such as brine electrolysis, sulfuric acid electrolysis, hydrochloric acid electrolysis, bromic acid electrolysis, etc. in addition to alkaline water electrolysis. In these types of electrolysis, a cathode side circulation tank and an anode side circulation tank are installed instead of the circulation tank 5 illustrated in FIG. 1. In this case, the cathode side electrolyte may be circulated between the cathode side circulation tank and the cathode chamber on the cathode side, and the anode side electrolyte may be circulated between the anode side circulation tank and the anode chamber on the anode side.

In addition, similarly to alkaline water electrolysis, only one of the cathode side electrolyte circulating means and the anode side electrolyte circulating means may be installed. For example, while the cathode side may have a configuration in which the cathode side electrolyte circulating means is provided and the electrolyte is circulated, and the anode side may have a configuration in which the electrolyte is discharged from the anode side electrolyte recovery line to the outside of the apparatus.

In alkaline water electrolysis, since both the cathode side electrolyte and the anode side electrolyte correspond to alkaline aqueous solutions, the impurities in the hydrogen gas and the anode gas contain alkaline mist. In other electrolysis, the impurities in the anode gas contain acid mist. In particular, in brine electrolysis, since the anode side electrolyte corresponds to a chloride aqueous solution, NaCl corresponding to solid matter may be mixed in the acid mist in some cases. Even in such electrolysis other than the alkaline water electrolysis, impurities in the gas can be removed and gas can be pressurized similarly to the above-described alkaline water electrolysis.

REFERENCE SIGNS LIST

1: electrolyzer
2: cathode chamber
3: anode chamber
4: diaphragm
5: circulation tank
6: electrolyte
7: cathode side electrolyte supply line
8: circulation pump
9: cathode side electrolyte discharge line
10: cathode side gas-liquid separating means
11: cathode side electrolyte recovery line
12: hydrogen gas discharge line
13: heat exchanger
14: anode side electrolyte supply line
15: circulation pump
16: anode side electrolyte discharge line
17: anode side gas-liquid separating means
18: anode side electrolyte recovery line
19: anode gas discharge line
20: heat exchanger
21: alkaline water tank
22: alkaline water
23: pump
24: pure water tank
25: pure water
26: pump
101: gas compression means
102: cathode side fluid mixture feed pipe
103: cathode side storage tank
104: cathode side circulation pump
105: cathode side circulation pipe
106: hydrogen gas discharge pipe
107: cathode side heat exchanger
110: cathode side ejector
111: nozzle
112: diffuser
112*a*: outlet of diffuser 112
113: suction port
114: suction chamber
120: cathode side circulation liquid ejection pipe
121: cathode side pump
201: impurity removal means
202: anode side fluid mixture feed pipe
203: anode side storage tank
204: anode side circulation pump
205: anode side circulation pipe
206: anode gas discharge pipe
207: anode side heat exchanger
210: anode side ejector
211: nozzle
213: suction port
220: anode side circulation liquid ejection pipe
221: anode side pump

The invention claimed is:

1. An electrolytic apparatus comprising:
an electrolyzer that comprises:
   an anode chamber accommodating an anode,
   a cathode chamber accommodating a cathode, and
   a diaphragm partitioning the anode chamber and the cathode chamber;
a cathode side electrolyte discharge line that is connected to the cathode chamber and discharges a cathode side electrolyte comprising hydrogen gas from the cathode chamber;
a cathode side gas-liquid separator that is connected to the cathode side electrolyte discharge line and separates the hydrogen gas from the cathode side electrolyte;
a hydrogen gas discharge line that is connected to the cathode side gas-liquid separator and discharges the hydrogen gas separated by the cathode side gas-liquid separator, from the cathode side gas-liquid separator; and
a gas compression means device connected to the hydrogen gas discharge line,
wherein the gas compression device comprises:
   a cathode side ejector connected to the hydrogen gas discharge line, a cathode side storage tank that stores the hydrogen gas and a cathode side circulation liquid flowing in the gas compression device, a cathode side fluid mixture feed pipe that connects the cathode side ejector and the cathode side storage tank to each other, and transfers a fluid mixture of the cathode side circulation liquid and the hydrogen gas from the cathode side ejector to the cathode side storage tank, a cathode side circulation pipe that connects the cathode side storage tank and the cathode side ejector to each other, and transfers the cathode side circulation liquid from the cathode side storage tank to the cathode side ejector, a cathode side circulation pump installed in the cathode side circulation pipe, a hydrogen gas discharge pipe that is connected to the cathode side storage tank and discharges the hydrogen gas from the cathode side storage tank, and a first valve provided in the hydrogen gas discharge pipe, wherein the electrolytic apparatus transfers the hydrogen gas into the cathode side ejector from the hydrogen gas discharge line by circulating the cathode side circulation liquid from the cathode side storage tank to the cathode side ejector through the cathode side circulation pump, the cathode side fluid mixture feed pipe, and the cathode side circulation pipe, the cathode side storage tank in the gas compression device is a single tank having one space in which the hydrogen gas and the cathode side circulation liquid are stored, the electrolytic apparatus mixes the hydrogen gas and the cathode side circulation liquid in the cathode side ejector, transfers a first impurity in the hydrogen gas to the cathode side circulation liquid, and removes the first impurity from the hydrogen gas, so that an amount of the first impurity in the hydrogen gas in the hydrogen gas discharge pipe is lower than an amount of the first impurity in the hydrogen gas in the hydrogen gas discharge line, and wherein the electrolytic apparatus raises a pressure of the hydrogen gas stored in the cathode side storage tank by controlling a flow rate of the cathode side circulation liquid circulating from the cathode side storage tank to the cathode side ejector, and further controlling opening and closing of the first valve.

2. The electrolytic apparatus according to claim 1, further comprising:

an anode side electrolyte discharge line that is connected to the anode chamber and discharges an anode side electrolyte containing anode gas from the anode chamber;

an anode side gas-liquid separator that is connected to the anode side electrolyte discharge line and separates the anode gas from the anode side electrolyte;

an anode gas discharge line that is connected to the anode side gas-liquid separator and discharges the anode gas separated by the anode side gas-liquid separator, from the anode side gas-liquid separator; and an anode side impurity remover connected to the anode gas discharge line, wherein the anode side impurity remover comprises;
an anode side ejector connected to the anode gas discharge line, an anode side storage tank that stores the anode gas and an anode side circulation liquid both flowing within the anode side impurity remover, an anode side fluid mixture feed pipe that connects the anode side ejector and the anode side storage tank to each other, and transfers a fluid mixture of the anode side circulation liquid and the anode gas from the anode side ejector to the anode side storage tank, an anode side circulation pipe that connects the anode side storage tank and the anode side ejector to each other, and transfers the anode side circulation liquid from the anode side storage tank to the anode side ejector, and an anode side circulation pump installed in the anode side circulation pipe, and wherein the electrolytic apparatus transfers the anode gas into the anode side ejector from the anode gas discharge line by circulating the anode side circulation liquid from the anode side storage tank to the anode side ejector through the anode side circulation pump, the anode side fluid mixture feed pipe, and the anode side circulation pipe, and the electrolytic apparatus mixes the anode gas and the anode side circulation liquid in the anode side ejector, transfers a second impurity in the anode gas to the anode side circulation liquid, and removes the second impurity from the anode gas.

3. The electrolytic apparatus according to claim 2,
wherein the anode side impurity remover further comprises:

an anode gas discharge pipe that is connected to the anode side storage tank and discharges the anode gas from the anode side storage tank, and a second valve provided in the anode gas discharge pipe, and wherein an amount of the second impurity in the anode gas in the anode gas discharge pipe is lower than an amount of the second impurity in the anode gas in the anode gas discharge line, and the electrolytic apparatus raises a pressure of the anode gas stored in the anode side storage tank by controlling a flow rate of the anode side circulation liquid circulating from the anode side storage tank to the anode side ejector, and further controlling opening and closing of the second valve.

4. The electrolytic apparatus according to claim 1,
wherein the cathode side electrolyte comprises an alkaline aqueous solution, and
the first impurity in the hydrogen gas comprises alkaline mist.

5. The electrolytic apparatus according to claim 2,
wherein the anode side electrolyte comprises an alkaline aqueous solution, and
the second impurity in the anode gas comprises alkaline mist.

6. The electrolytic apparatus according to claim 2,
wherein the anode side electrolyte comprises a chloride aqueous solution, and
the second impurity in the anode gas comprises acid mist.

7. The electrolytic apparatus according to claim 2,
wherein the anode side electrolyte comprises hydrochloric acid, and
the second impurity in the anode gas comprises acid mist.

8. The electrolytic apparatus according to claim 2,
wherein the anode side electrolyte comprises a bromic acid aqueous solution, and
the second impurity in the anode gas comprises acid mist.

9. The electrolytic apparatus according to claim 2,
wherein the anode side electrolyte comprises a sulfuric acid aqueous solution, and
the second impurity in the anode gas comprises acid mist.

* * * * *